(12) United States Patent
Gupta et al.

(10) Patent No.: US 11,706,480 B2
(45) Date of Patent: Jul. 18, 2023

(54) SYSTEMS AND METHODS FOR PROCESSING OVERLAPPING CONTENT

(71) Applicant: Rovi Guides, Inc., San Jose, CA (US)

(72) Inventors: Vikram Makam Gupta, Karnataka (IN); Vishwas Sharadanagar Panchaksharaiah, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/801,886

(22) Filed: Feb. 26, 2020

(65) Prior Publication Data

US 2021/0266632 A1    Aug. 26, 2021

(51) Int. Cl.
| | |
|---|---|
| *H04N 21/4335* | (2011.01) |
| *G06N 20/00* | (2019.01) |
| *G06N 5/04* | (2023.01) |
| *H04N 21/442* | (2011.01) |
| *H04N 21/466* | (2011.01) |
| *H04N 21/6587* | (2011.01) |
| *G06F 16/23* | (2019.01) |
| *G06Q 30/0601* | (2023.01) |

(52) U.S. Cl.
CPC ..... *H04N 21/4335* (2013.01); *G06F 16/2379* (2019.01); *G06N 5/04* (2013.01); *G06N 20/00* (2019.01); *H04N 21/44222* (2013.01); *H04N 21/4662* (2013.01); *H04N 21/6587* (2013.01); *G06Q 30/0629* (2013.01)

(58) Field of Classification Search
None
See application file for complete search history.

(56) References Cited

U.S. PATENT DOCUMENTS

| | | | | |
|---|---|---|---|---|
| 10,812,846 | B1* | 10/2020 | Vantalon | ............ G06F 16/24552 |
| 2017/0177718 | A1* | 6/2017 | Loganathan | ............ H04L 67/22 |
| 2020/0177957 | A1* | 6/2020 | Vandikas | ......... H04N 21/23418 |

* cited by examiner

*Primary Examiner* — Omar S Parra
(74) *Attorney, Agent, or Firm* — Haley Guiliano LLP

(57) ABSTRACT

A computer implemented method that includes receiving first user usage data and second user usage data indicative of user usage during consumption of a first content and of a second content, respectively. The method includes determining a first user usage pattern for the first content and a second user usage pattern for the second content based on the first user usage data and on the second user usage data, respectively. The method determines potential content overlap between the first content and the second content based on a comparison of the first usage pattern and the second usage pattern and performs an optimization operation based on the potential content overlap.

19 Claims, 7 Drawing Sheets

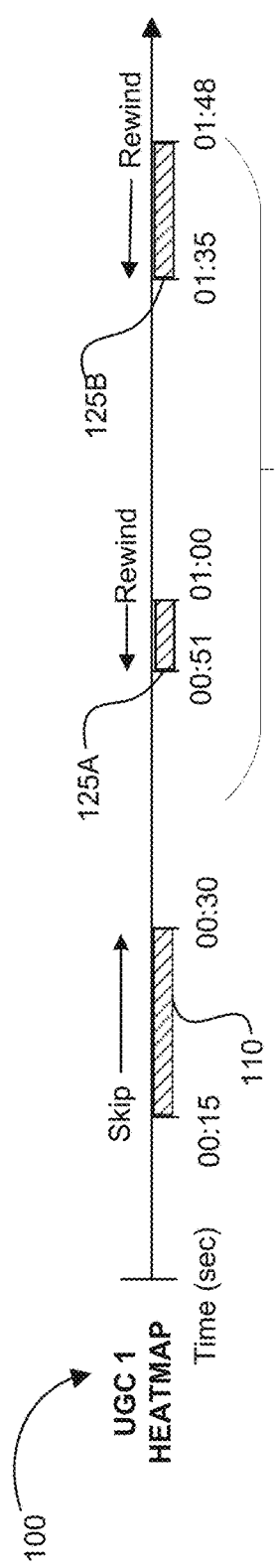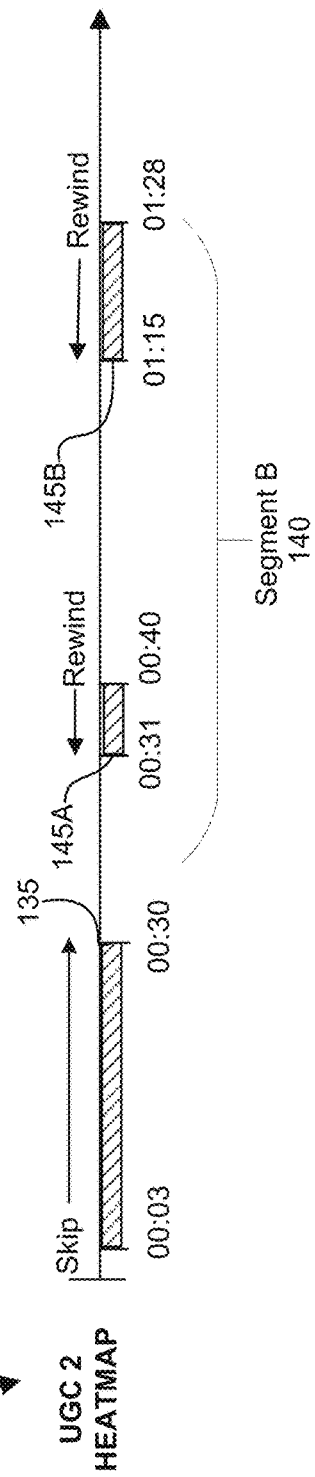

SYSTEMS AND METHODS FOR PROCESSING OVERLAPPING CONTENT

BACKGROUND

The present disclosure relates to systems and processes for identifying and processing overlapping media content.

SUMMARY

Digital videos, music, and other shared content is often identified by particular metadata (e.g., unique tags, encryption) that help storage systems and users identify and verify the content such as for purposes of authenticity and avoiding duplication. User generated content (UGC) is continually generated, distributed, and shared between users across a wide variety of platforms such as YouTube and WhatsApp. However, as UGC gets regenerated and redistributed using various platforms, it is not generally identified by any particular standard or reliable identification information (e.g., metadata). Thus, multiple uploads and/or transfers of the same content to and across platforms may be unnecessarily duplicated and/or misidentified by various systems and system users. The duplication and lack of identification may lead to slower distribution, excessive use of premium storage resources, and confusion by content consumers. In some cases, certain content may be proprietary and its distribution unauthorized. Determining whether UGC includes particular content can be challenging and expensive. Some techniques for addressing such issues include processor-intensive comparisons between different content to identify similarities between content files (e.g., utilizing video/sound compression). However, because of the high volume of UGC, such techniques are generally too slow and impractical.

Techniques are described for tracking and identifying UGC in order to optimize its distribution and use across UGC sharing platforms. In some embodiments, once a particular UGC is introduced (e.g., uploaded by a user), usage data associated with the UGC is collected including, for example, metadata reflecting the playing, replaying, seeking, scrubbing, pausing, forwarding, rewinding, and other content-associated actions of particular portions of the content. This usage data may be referred to as a "heatmap." It may be generated based upon the usage data across numerous users and may be analyzed, for example, utilizing machine learning and/or statistical analysis to identify reoccurring patterns within usage data associated with particular segments of content. A sufficient number of instances of a particular pattern or similar patterns may be used to establish a heatmap (e.g., as a foundation for a minimum level of statistical significance). In some embodiments, multiple heatmaps may be associated with a particular UGC. For example, different classes of users (e.g., children, adults, users having different content interests, etc.) may use content in different ways.

Once a heatmap for a UGC has been established, it may be attached to or associated with the associated UGC. In some embodiments, the heatmap may be included in a UGC file or stored in a data store (e.g., a database system) including a record associating the UGC with the heatmap. When a UGC is accessed such in a content player or a file system, the associated heatmap may be retrieved directly from a UGC file attaching the heatmap or by using a unique identification parameter linking the UGC (e.g., using a database) to a separately stored heatmap.

When segments of content are associated with heatmaps described above, the heatmaps of separate content (e.g., separate UGCs) may be compared to identify potentially matching/overlapping content between them. The comparison may include statistical analysis and/or artificial intelligence to determine sufficient similarly between the heatmaps to associate all or parts of separate content (e.g., separate UGCs) as matching. Matching of content may be used to optimize playback and/or storage of the matching/overlapping content. In some embodiments, matching/overlapping content is stored within the same memory location to avoid unnecessary duplication of the content within the memory storage.

In some embodiments, playback of content is based upon an associated heatmap. Default or automatic playback of a UGC may be based upon an associated heatmap. For example, those portions of a content typically skipped over by users as reflected in a heatmap may be automatically skipped when users playback the content. Other usage reflected in a heatmap (e.g., pausing, slowing, repeating, etc.) may also be automatically applied during further use of a content. In some embodiments, playback tools can be configured to automatically apply certain usage patterns and/or ignore others obtained from heatmaps during playback. Where a UGC has multiple associated heatmaps, a particular heatmap may be applied depending upon context (e.g., based upon a device/user that can be linked with a heatmap).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1A shows an illustrative usage map ("heatmap") according to some embodiments of the disclosure.

FIG. 1B shows an illustrative heatmap of content overlapping the content of FIG. 1A according to some embodiments of the disclosure.

FIG. 1C shows an illustrative segment/heatmap of identified overlapping content corresponding to the heatmaps of FIGS. 1A and 1B.

DETAILED DESCRIPTION

Figures 2A, 2B:
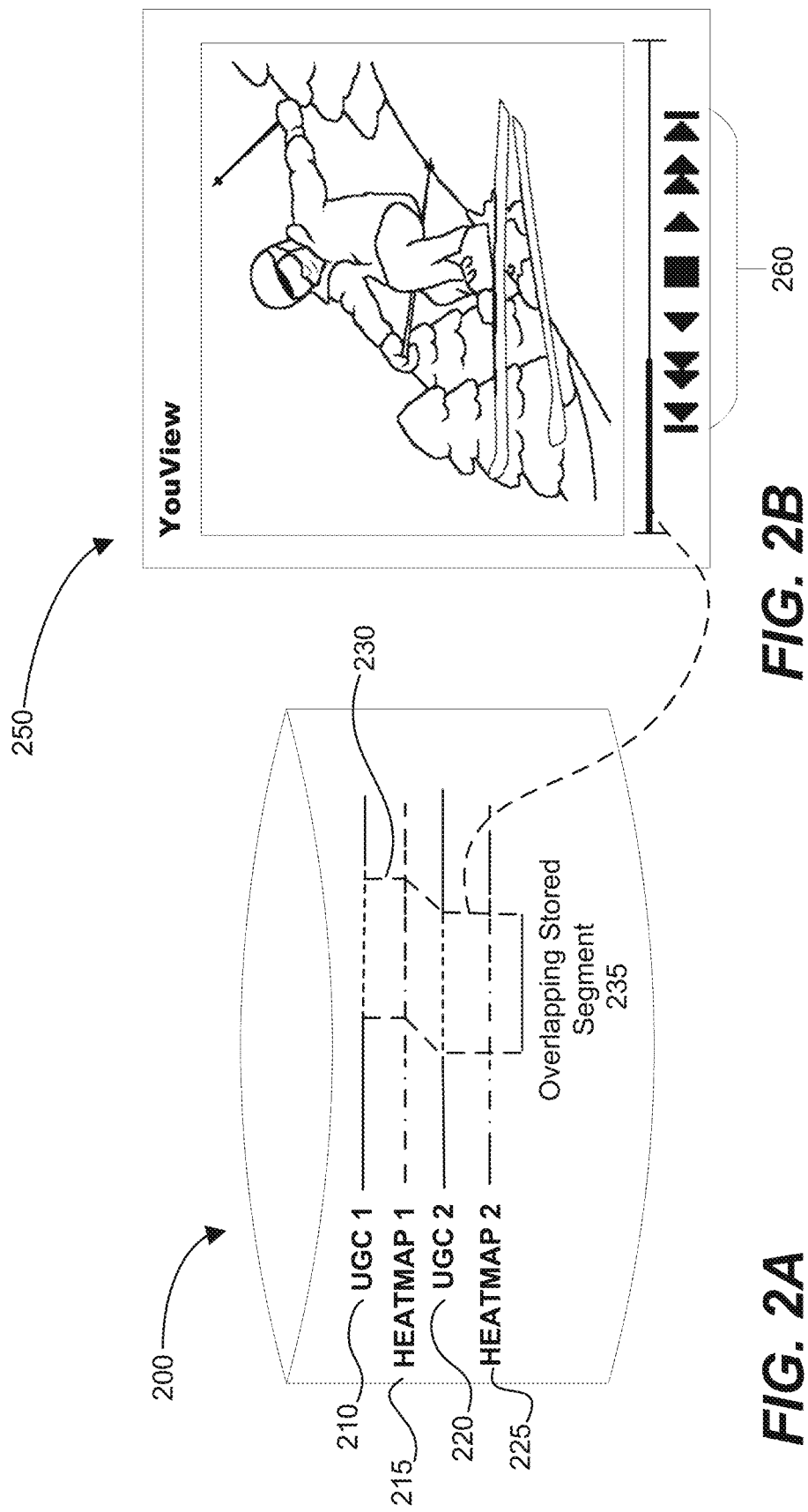
FIG. 2A shows an illustrative storage device storing content and heatmaps according to some embodiments of the disclosure.
FIG. 2B shows an illustrative user interface for consuming content according to some embodiments of the disclosure.

Techniques are described for identifying and analyzing overlapping user generated content (UGC) in order to optimize UGC distribution and use across sharing platforms. In some embodiments, usage maps are generated to characterize a particular UGC. Heatmaps of separately identified UGC (e.g., content separately uploaded to a sharing platform) are used to determine if the separately identified UGC may have all or some of the same content. Separately identified UGC determined to have the same (overlapping) content may be processed (e.g., stored/replayed) in an optimized manner such as further described herein.

A usage map including a user usage map (or "heatmap") may reflect all or part of a content. A heatmap may represent usage data over part or all of the content's duration of presentation and correlate across multiple users. Usage data may include a series of user usage events mapped to particular time points or content frames within the content. User usage events/activity may include, for example, user-directed pauses, skips, rewinds, replays, and other events/activity. Content may include a recorded video with a series of video frames demarked by particular time-points. In some embodiments, a video heatmap may include usage events associated with these frames and/or time-points of the content.

FIG. 1A shows an illustrative heatmap and FIG. 1B shows an illustrative heatmap of content overlapping the content of FIG. 1A according to some embodiments of the disclosure. Heatmap 100 of FIG. 1A includes a series of events mapped to particular time-points of a UGC ("UGC 1"). Heatmap 100 includes a "skip" event at 110 representing user-directed skipping of a portion of UGC 1 (between time points 00:15 and 00:30 seconds), and "rewind" events at 125A (between time points 00:51 and 1:00 seconds) and 125B (between time points 01:35 and 1:48 seconds). Heatmap 130 of FIG. 1B reflects a second UGC ("UGC 2") including a "skip" event at 135 representing a user-directed skipping of a portion of UGC 2 (between time points 00:03 and 00:30), and "rewind" events at 145A (between time points 00:31 and 0:40 seconds) and 145B (between time points 01:15 and 1:28 seconds).

The events reflected by heatmaps 100 and 130 may reflect usage data among numerous occurrences of consumption (and among numerous users) of the respective content. In some embodiments, the usage data is analyzed statistically to identify events in sufficient numbers with sufficiently common characteristics in type and timing with respect to the content. For example, a minimum number of usage occurrences may reflect a particular common event in the usage data (e.g., a skip event at 110 sufficiently proximate in location and length to a period (00:15 to 00:30 secs) of UGC 1). In some embodiments, a machine learning (ML) system is programmed to analyze the usage data and determine sufficient correlations to identify likely common usage events. The ML system may learn (e.g., based upon feedback to prior determinations) to improve correlation determination.

A series of common events may be compiled to form a heatmap for the content. The determined heatmap parameters may be in the form of, for example, a stand-alone computer file, a database record, and/or integrated into a respective content file. The heatmap(s) can then be later accessed such as through these forms of storage.

Use of generated heatmaps may include optimizing use and related processing of the respective content. In some embodiments, optimizing use includes determining overlapping (common) portions of separate content. Determining overlapping content may include comparing the heatmaps of respective content and identifying a common pattern of events in the heatmaps. Identifying a common event pattern may include identifying events with similar or the same characteristics (e.g., by type and length of event) distributed similarly across a similar content time interval. In some embodiments, the patterns may not necessarily correspond exactly but can be within particular thresholds of similarity (e.g., within particular time extents) for correlating them with overlapping content.

In some embodiments, a machine learning system is programmed to correlate such patterns among heatmaps as corresponding to overlapping content. In some embodiments, feedback provided in response to identified overlaps (e.g., determining the overlaps were incorrectly identified) is used to (re-)program the machine learning system to improve overlap identification.

Based upon analysis such as described herein, a pattern 120 within heatmap 100 over content segment 120 of UGC 1 ("Segment A") is identified as a potential match with a pattern 140 within heatmap 130 over content segment 140 of UGC 2 ("Segment B"). Analysis may base the potential match, at least in part, on correlating "rewind" events 125A and 125B of heatmap 100 with "rewind" events 145A and 145B of heatmap 130 as being sufficiently similar in type, length, and proximity to each other within the respective heatmaps. After a potential match is identified, the potential match may be further analyzed to confirm the potential match as a match (e.g., by analyzing the actual content). The potential match may be recorded in a database record, a heatmap file, and/or in the associated content file(s). The potential match may be identified as a segment of a content (e.g., time segment) and/or in a heatmap format.

FIG. 1C shows an illustrative segment/heatmap of identified overlapping content (portions 120 ("Segment A") and 140 ("Segment B")) corresponding to the heatmaps of FIGS. 1A and 1B, respectively, according to some embodiments of the disclosure. In some embodiments, the segment/heatmap 170 includes the overlapping content and/or heatmap for the identified content. The overlapping content may be stored in a single or limited set of designated locations accessible during the playback of either UGC 1 or UGC 2 in order to avoid duplicative storage of the same content. The overlapping heatmap of 170 reflects the respective heatmaps of overlapping segments 120 and 140 in which the rewind events 175A and 175B of segment 170 reflect events 125A and 125B of segment 120 and events 145A and 145B of segment 140.

In some embodiments, a response to a user request to playback UGC 1 or UGC 2 (or other content with the same overlapping segment) results in a selective automatic playback 160 of overlapping content of segment 170. The playback may include accessing the content at a designated location for storing overlapping content. Playback may also automatically reproduce the usage reflected in the heatmap of overlapping segment 170 by rewinding segment 170 at segment locations 175A and 175B. Thus, based upon heatmaps, consumption of overlapping content or content used in a commonly identified way may be optimized both in the manner it is stored and reused.

FIG. 2A shows an illustrative storage device storing content and heatmaps according to some embodiments of the disclosure. FIG. 2B shows an illustrative user interface 250 for consuming content according to some embodiments of the disclosure. A storage system 200 stores content including UGC 210 and UGC 225 and respective heatmaps 215 and 220. Based upon analysis of heatmaps 215 and 220 such as describe herein, an overlap 230 is identified. Based upon identifying the overlap 230, the overlapping segment for both UGC 210 and UGC 225 is stored in a shared portion 235 of storage system 200.

User interface 250 is configured for providing UGC consumption including the displaying of UGC 210 and UGC 220 in a display window. User interface 250 provides controls 260 for controlling the display of UGC including, for example, start, pause, rewind, and fast-forward controls. User interface 250 may be a component of a computer user application installed on a user device (e.g., user devices 545 or 540 of FIG. 5A described further herein). The application may be configured to access UGC 210 and UGC 220 via storage system 200. When user interface 250 accesses the overlap 230 of UGC 210 or UGC 220, the user interface utilizes the shared portion 235 from the same storage location. In some embodiments, shared storage of overlapping segments does not occur on the same storage device. Storage may be distributed over, for example, a virtual and/or cloud storage system.

In some embodiments, playing the shared portion 235 is a default action when user interface 250 receives a command to display either UGC 210 or UGC 220. In some embodiments, playback includes utilizing the heatmaps 215 or 225 to control the display of the UGC. For example, a default playback may incorporate some or all of the usage activity reflected in the heatmap (e.g., pausing, rewinding, fast-forwarding, etc.) mapped to corresponding portions of the UGC.

Figure 3:
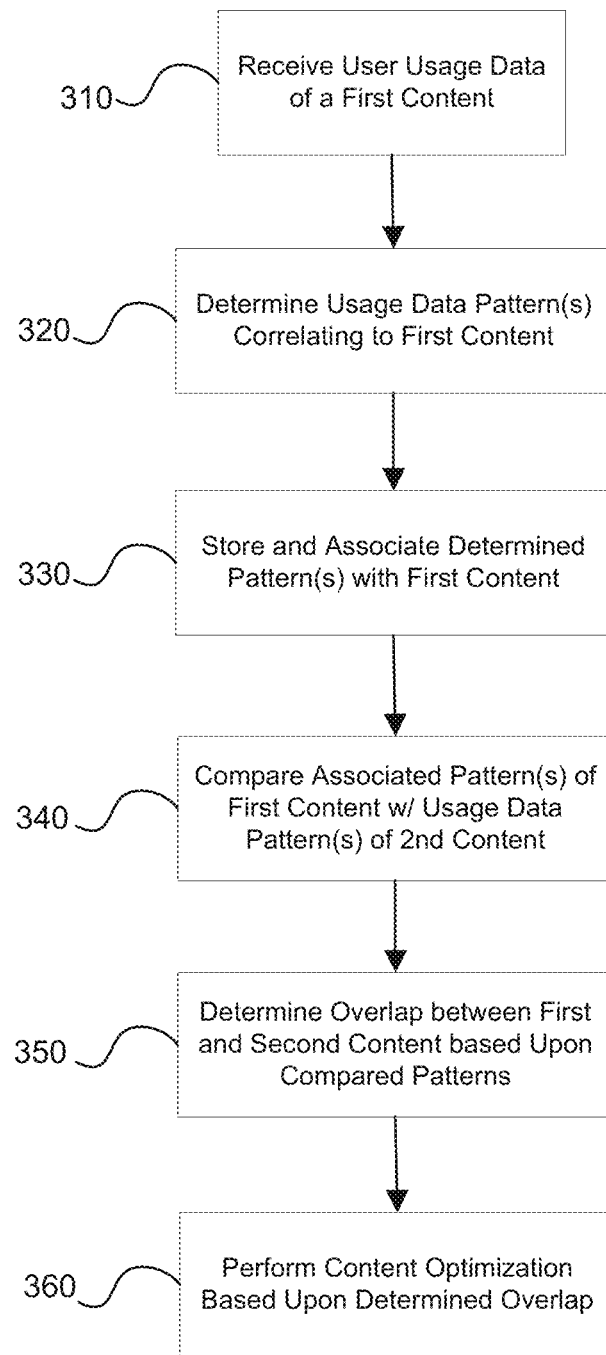
FIG. 3 shows an illustrative flowchart of generating and utilizing a heatmap according to some embodiments of the disclosure.

FIG. 3 shows an illustrative flowchart of generating and utilizing a heatmap according to some embodiments of the disclosure. At block 310, user usage data relating to a first content (e.g., a UGC) is received such as at a server device. The usage data may be received from multiple user devices installed with programs (e.g., with user interface 250) for playing content including, for example, devices 540 and 545 of FIG. 5A. The usage data may be collected, consolidated, and organized with respect to particular UGCs such as within a central storage/database system.

At block 320, the usage data for the first content is analyzed in order to identify any common patterns across multiple uses. For example, the frequency of certain user actions (e.g., a pause, fast-forward, replay) at particular times/frames within the content is analyzed to determine if the actions are statistically meaningful among the data set to include as part of a heatmap for the content. Statistical meaningfulness can be configured and/or adapted based upon, for example, a minimum number of samples, particular types of content, types of users, and/or feedback to a machine learning system. For example, a system can be configured to identify a pattern if it occurs during at least ten uses of a content within a particular margin of error.

At block 330, once a pattern or set of patterns has been established for a particular content, the pattern or set of patterns are used to generate and store a first heatmap within memory that is associated with the first content (e.g., within a database record or in an associated content file). After a first heatmap is associated with a first content, it may be compared at block 340 to a second heatmap of a second content (e.g., that was generated in a similar manner as the first heatmap). Comparisons may be performed by determining a common pattern of usage events between the first and second heatmaps.

At block 350, determining common patterns between the heatmaps may be used to indicate overlapping portions between the first and second content. For example, multiple replay events separated from each other over similar timespans in the first and second heatmaps may indicate that the heatmaps reflect the same or similar content portions overlapping the first and second content. Types of heatmap similarities that indicate overlapping content may be configured in the system such as based upon minimum thresholds including the number and types of usage events and the time differences between evens among the heatmaps.

What indicates overlapping content may further be based and "learned" from training and feedback as input to a machine learning system. For example, after an overlap is determined using heatmaps, a confirmatory comparison may be performed between the respective content to determine if the overlap actually occurred (e.g., comparing some or all of the pertinent frames of the content with each other). A "false positive" identification may be used to further train how overlapping content is identified by comparing certain similarities of heatmaps.

At block 360, an identification of overlapping content is used to perform an optimization including, for example, optimizing the storage of overlapping content described with respect to FIGS. 2A and 2B. Optimization may also include the automatic replay of overlapping content such as described in FIG. 1C. Other optimizations may include notifying a user that new content they have accessed or obtained overlaps content that they previously accessed or consumed. Other optimizations may include performing searches for particular content by comparing heatmaps of content. For example, a user may wish to determine if content within a data store or within a network of stores (e.g., the internet) is similar to content identified by a particular heatmap or to a selection/subset of heatmap properties.

Figure 4:
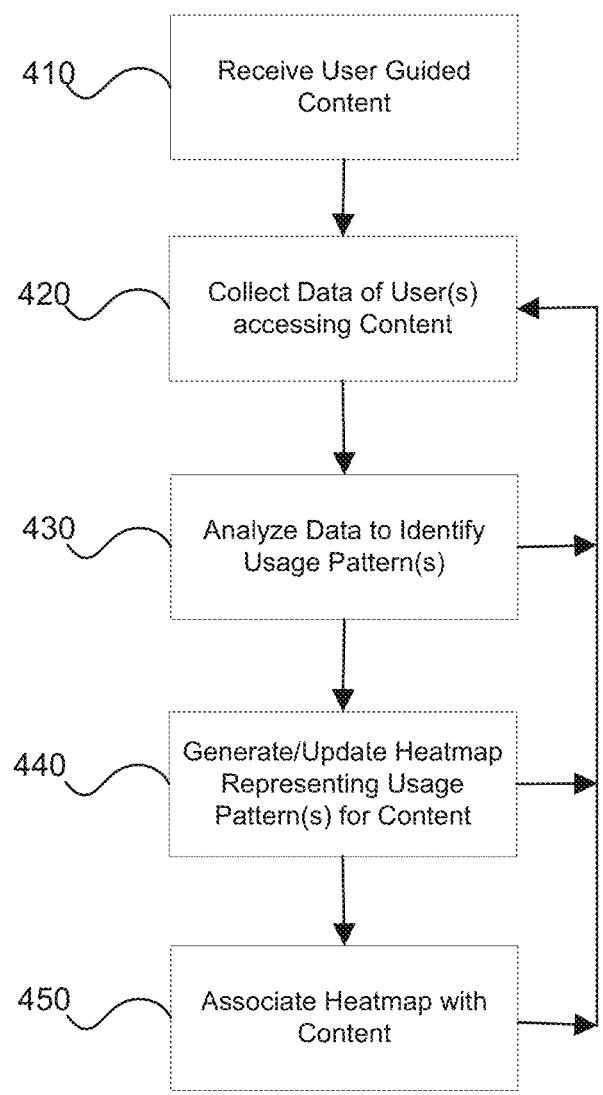
FIG. 4 shows an illustrative flowchart of generating and heatmap according to some embodiments of the disclosure.

FIG. 4 shows an illustrative flowchart of generating and heatmap according to some embodiments of the disclosure. At block 410, a UGC is received such as at a network server (e.g., network server 530 of FIG. 5A). At block 420, data is collected reflecting usage data of the UGC. For example, the usage data may be collected (e.g., generated by user monitoring user activity) from user devices 540 and 545, and transmitted to network server 530 of FIG. 5. At block 430, the usage data is analyzed to determine if it is sufficient to establish a heatmap or update an existing heatmap. Sufficiency may be based upon a minimum amount or threshold of usage data collected. The minimum threshold may be manually programmed into a system and/or learned/updated by the system for generating/updating heatmaps that is predictive of content usage patterns. If the collected usage data is determined not to be sufficient for establishing or updating a heatmap, additional usage data for the content may continue to be collected at block 420 until it is sufficient.

At block 440, after usage data is analyzed and it is determined that the data is sufficient to establish or update a heatmap, a new heatmap is generated and/or an existing heatmap is updated to reflect the collected usage data. In some embodiments, the usage data is preprocessed such as to eliminate "noise," apply smoothing, filter, and/or apply other data processing techniques known to those of ordinary skill in the art. If the data is used to update an existing heatmap, additional usage data for the content may continue to be collected at block 420 for purposes of further refining/ updating the heatmap.

At block 450, once sufficient data has been collected and analyzed to establish a heatmap, a new heatmap is generated based upon the analysis and the heatmap is associated with the respective content. The heatmap may be stored with the content (e.g., in a file header portion) or stored separately and associated with the respective content (e.g., in a separate file and/or database record). After generation of the heatmap for the respective content, additional usage data for the content may continue to be collected at block 420 for purposes of further refining/updating the heatmap. In some embodiments, multiple heatmaps may be generated for the same content (e.g., reflecting different usage patterns for different sets of users).

Figure 5A:
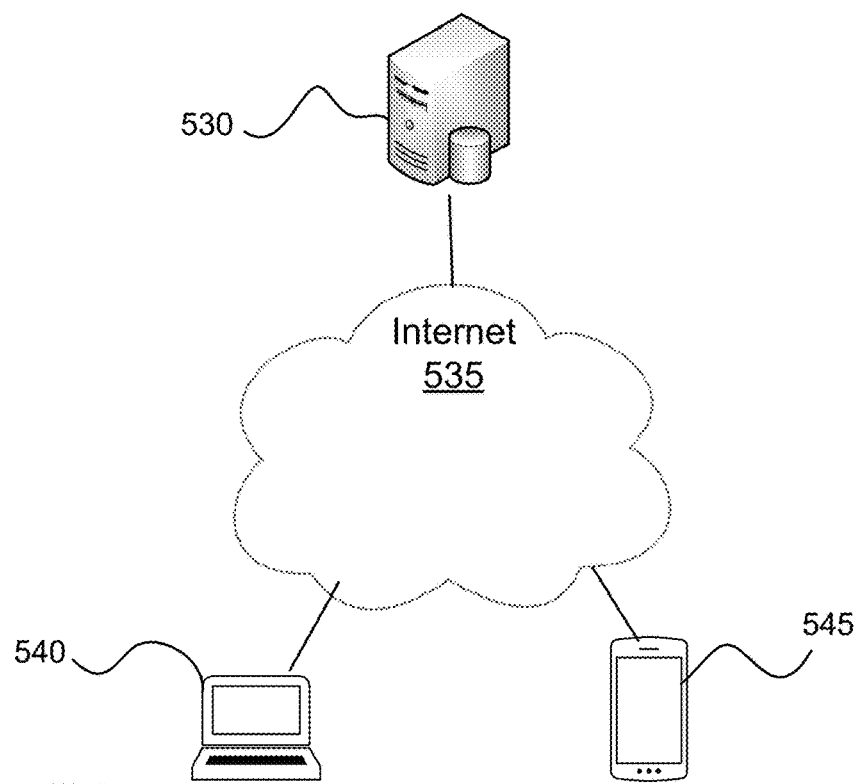
FIG. 5A shows an illustrative network topology of devices for processing heatmaps according to some embodiments of the disclosure.

FIG. 5A shows an illustrative network topology of devices for processing heatmaps according to some embodiments of the disclosure. A network server 530 is configured to permit user devices 540 and 545 the ability to upload and/or identify content (e.g., UGCs) to network server 530. Network server 530 and/or other servers may be configured to collect usage data associated with the identified content such as across internet 535. For example, a program (e.g., an app or web interface) installed on user devices 540 and 545 may track user usage of the identified content including, for example, fast-forwarding, rewinding, replaying, pausing, etc. of the content. The tracked user usage data may be transmitted to and collected by network server 530, by which it may be stored and associated with the respective content.

After user usage data is collected for a content, it may be analyzed and used to generate a heatmap for the content such as further described herein. The heatmap may be stored with the content and/or stored separately and administered with the use of a server (e.g., server 530 and/or connected databases). Thereafter, optimizations of the storage and use of the content using the heatmap may be implemented such as through server 530 and devices 540 and 545. For example, server 530 may identify separate content as having overlapping portions by comparing respective heatmaps and, in response, cause the storage of the overlapping portions to be consolidated in a connected storage system (e.g., as shown in FIGS. 2A and 2B). Thus, when a device such as device 540 or 545 attempts to access overlapping content of different UGCs via server 530, server 530 may utilize the consolidated storage area for the use of overlapping portions.

Figure 5B:
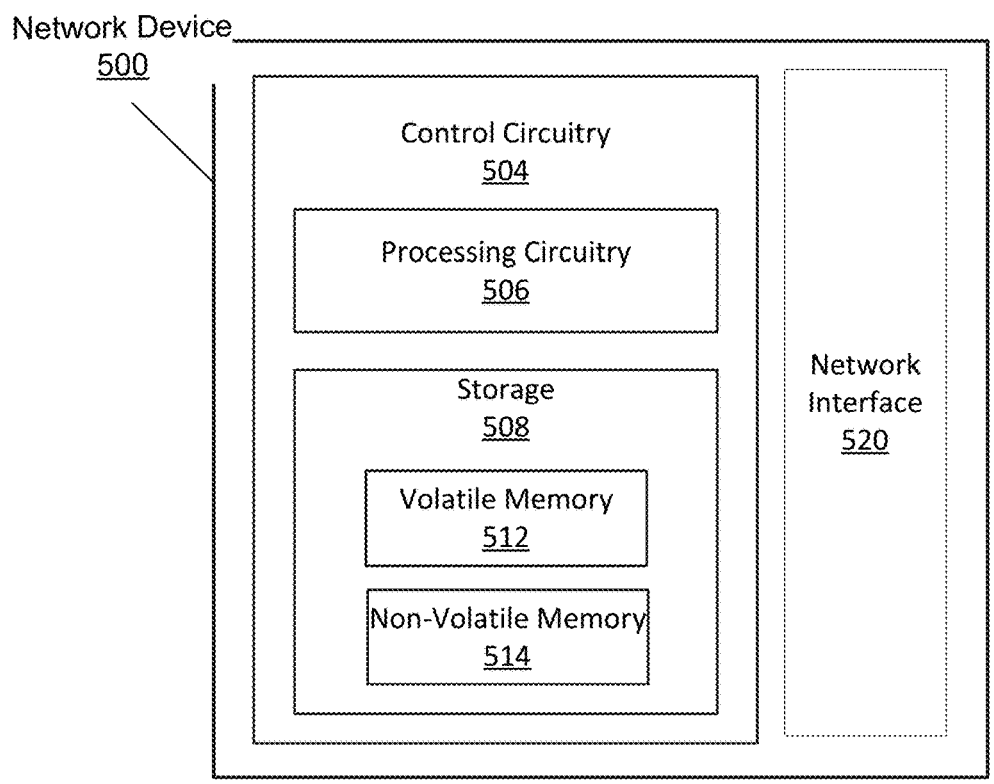
FIG. 5B shows an illustrative block diagram of a device for processing a heatmap according to some embodiments of the disclosure.

FIG. 5B shows an illustrative block diagram of a device for processing a heatmap according to some embodiments of the disclosure. A system for generating and performing heatmap operations may include, for example, servers, data storage devices, communication devices, display devices, and/or other computer devices such as shown in FIG. 5A. Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer.

In some embodiments, processing circuitry 506 may be distributed across multiple separate processors or processing units, for example, multiple of the same type of processing units (e.g., two Intel Core i7 processors) or multiple different processors (e.g., an Intel Core i5 processor and an Intel Core i7 processor). A network interface 520 may be used to communicate with other devices in a network system (e.g., devices 530, 540, and 545 as shown in FIG. 5A) or with other devices connected to internet 535.

In some embodiments, control circuitry 504 executes instructions for execution of heatmap generation and/or processing functions stored in memory (i.e., storage 508). The instructions may be stored in either a non-volatile memory 514 and/or a volatile memory 512 and loaded into processing circuitry 506 at the time of execution. A system for generating and processing heatmaps (e.g., the systems described in reference to FIGS. 5A and 6) may be a stand-alone application implemented on a user device (e.g., device 540 and/or 545) and/or a server (e.g., device 530) or distributed across multiple devices in accordance with device 500. The system may be implemented as software or a set of executable instructions. The instructions for performing any of the embodiments discussed herein of content depiction generation may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, instructions in accordance with the processes of FIGS. 3, 4, and 7 may be stored in storage 508, and executed by control circuitry 504 of device 500.

Figure 6:
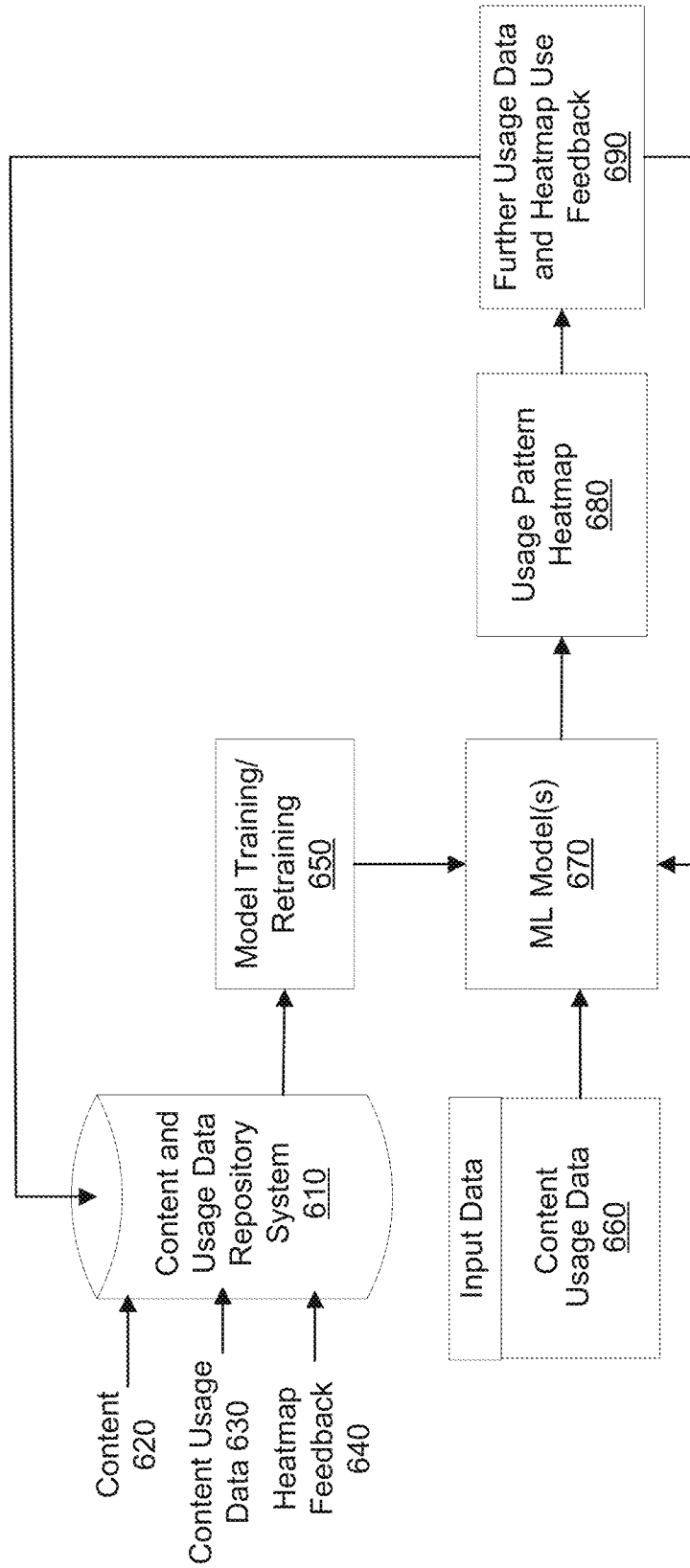
FIG. 6 shows an illustrative block diagram of a machine learning system for generating a heatmap according to some embodiments of the disclosure.

FIG. 6 shows an illustrative block diagram of a machine learning system for generating a heatmap according to some embodiments of the disclosure. A content and usage data repository system 610 may include servers, data storage, and database systems for collecting and storing content 620, content usage data 630, heatmaps, and/or heatmap use feedback data 640 such described herein. Based upon content 620, its usage data 630, and/or feedback data 640, a model training/retraining module 650 is programmed or "learns" how to correlate usage data with portions of content and generate a heatmap based upon the correlations (e.g., as shown in FIGS. 1A and 1B). The usage data can be comprised of recorded patterns of user commands or behavior associated with different time points or frames within the content.

The machine learning models are programmed to identify the patterns across multiple samples of uses of the content. These models may employ, for example, linear regression, logistic regression, multivariate adaptive regression, locally weighted learning, Bayesian, Gaussian, Bayes, neural network, generative adversarial network (GAN), and/or others known to those of ordinary skill in the art. Multiple models may be used with results combined, weighted, and/or otherwise compared in order to determine correlations and patterns in the usage data with respect to the content.

At block 670, a system programmed with the model(s) receives new content usage data from block 660 pertaining to a particular content. Applying the model(s) to the new input data, one or more heatmaps are output at block 680, which can be associated with the content such as described herein. The heatmaps may be distributed and used for performing optimizations such as shown in FIGS. 1 and 2. The machine learning system may collect additional usage data at block 690 for the particular content and/or feedback responsive to the heatmaps it generated. For example, feedback may reflect that the heatmap does not correlate well with further use of the content or with other content that has been identified as overlapping based upon comparing the heatmap with other heatmaps of other content. The further usage data and feedback data may be used to reprogram/update the model(s) of the machine learning system and/or to update a heatmap associated with a content.

Figure 7:
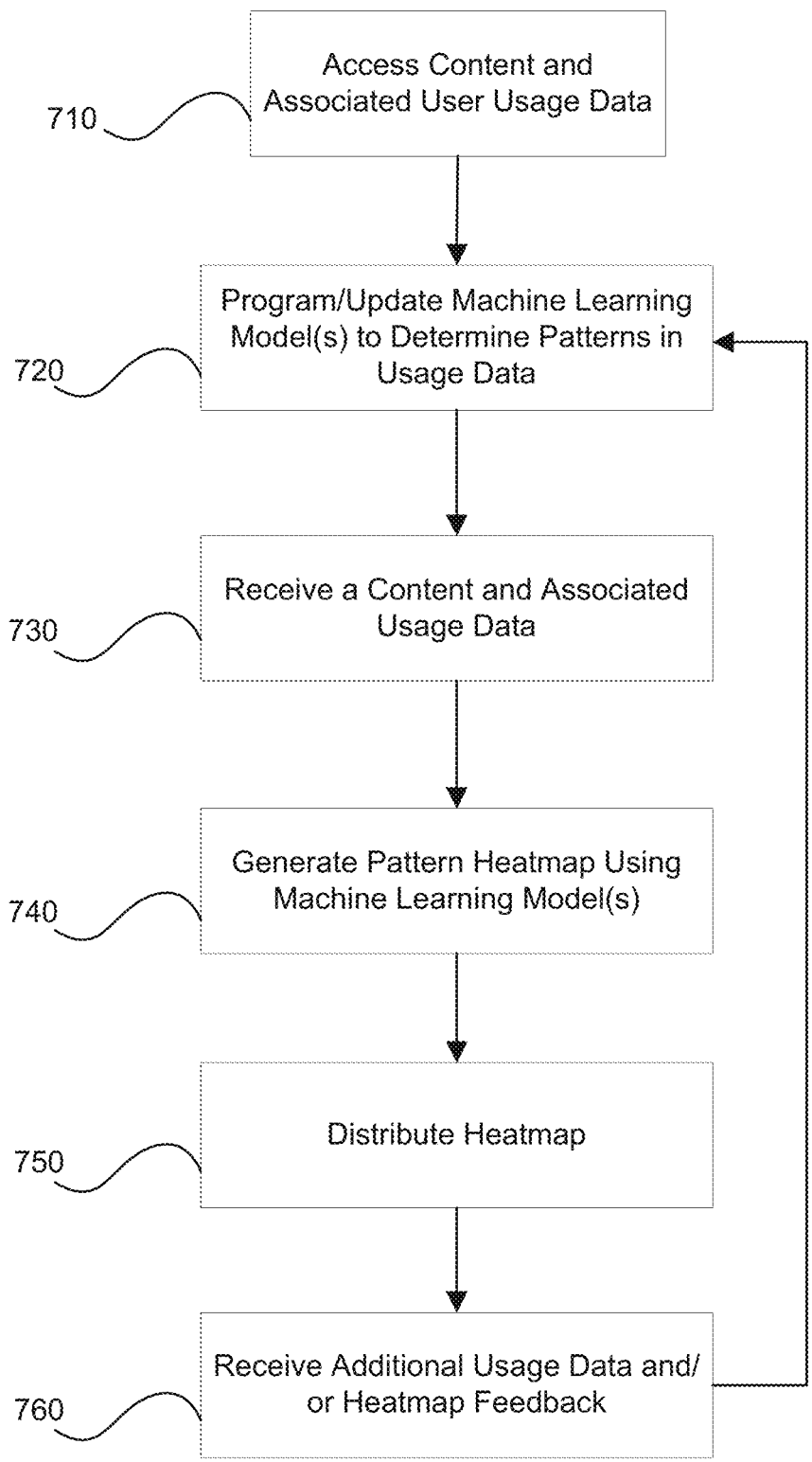
FIG. 7 shows an illustrative flowchart of generating a heatmap using a machine learning system according to some embodiments of the disclosure.

FIG. 7 shows an illustrative flowchart of generating a heatmap using a machine learning system according to some embodiments of the disclosure. At block 710, a machine learning system (e.g., such as shown in FIG. 6) accesses content and associated user usage data. The content and associated user data can be sufficient to reflect patterns of use of the content (e.g., based upon reasonably sufficient sample sizes). The content may include different instances and/or compositions/formats of overlapping content in which the overlapping portions have been previously identified (or independently verified) for the machine learning system. At block 720, the machine learning system develops and/or updates one or more models that correlate patterns of usage with particular content. In some embodiments, the correlating may be confirmed/reinforced and/or updated based upon new data it receives.

At block 730, the machine learning system receives user usage data for a newly identified content. The usage data may span across multiple users and/or platforms and is collected and stored such as further described herein. The usage data may be preprocessed (e.g., filtered, smoothed, etc.) and analyzed to determine if it is adequate (e.g., a minimum sample size, etc.) to generate a sufficiently representative heatmap. At block 740, the user usage data is processed by the one or more machine learning models to generate one or more heatmaps for the content.

At block 750, the heatmap(s) may be attached to or otherwise associated with the content and are thereby distributed for use in optimization processes such as described herein. At block 760, the machine learning system may receive additional user usage data and use the data at block 720 to update an associated heatmap and/or reprogram the models used to generate heatmaps.

The machine learning system may be programmed with a model to determine if two heatmaps represent content with overlapping portions. The model may be trained to identify heatmaps associated with different content as having potentially matching overlapping content portions based upon similar heatmap features (e.g., patterns of usage) corresponding to the portions.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

We claim:

1. A computer implemented method comprising:
receiving first user usage data and second user usage data indicative of user usage during consumption of a first user generated content and of a second user generated content, respectively, wherein the first and second user generated content are separate content;
determining a first user usage pattern for the first user generated content and a second user usage pattern for the second user generated content based on the first user usage data and on the second user usage data, respectively;
comparing the first usage pattern and the second usage pattern;
based on the comparing, determining the first user generated content and the second user generated content match; and
in response to the determining that the first user generated content and the second user generated content match:
accessing a heatmap of metadata reflecting at least one of replaying, seeking, scrubbing, pausing, forwarding, or rewinding portions of the first user generated content; and
playing the second user generated content, wherein the playing of the second user generated is automatically controlled by automatic application of at least one of replaying, seeking, scrubbing, pausing, forwarding, or rewinding portions of the second user generated content based on the heatmap.

2. The method of claim 1, wherein the usage data comprises user navigation data of the first and second user generated content, and wherein the user navigation data reflects at least one of the playing, replaying, seeking, scrubbing, pausing, forwarding, or rewinding of the first and second user generated content.

3. The method of claim 1, wherein the optimization operation comprises consolidating the storage of matching content in a shared location of computer memory, and wherein the optimization comprises replay of the first user generated content and second user generated content using stored content from the shared location of computer memory.

4. The method of claim 1, wherein determining a usage pattern comprises identifying common usage activity across a plurality of user usage data around particular time segments of respective content.

5. The method of claim 1, wherein identifying common usage activity comprises analyzing the usage activity within a machine learning system, the machine learning system trained with samples of usage data corresponding to samples of content, and wherein determining potential content overlap comprises using the machine learning system to determine a likelihood of an overlap based upon comparing patterns in the first and second usage patterns.

6. The method of claim 1, wherein at least one of the first and second usage patterns are stored in a data file with the respective first and second user generated content.

7. The method of claim 1, wherein at least one of the first and second usage patterns are stored in a database record associated with the respective first and second user generated content.

8. The computer implemented method of claim 1, wherein the first user generated content and the second user generated content are optimized for use across a plurality of user generated content platforms.

9. The method of claim 1, wherein the first user usage pattern and the second user usage pattern includes the heatmap of metadata, and wherein the heatmap of metadata reflects the at least one of replaying, seeking, scrubbing, pausing, forwarding, or rewinding of particular portions of the first user generated content and the second user generated content, respectively, and wherein the heatmap of the first user generated content and the heatmap of the second user generated content are asynchronous.

10. The method of claim 1,
wherein the heatmap of metadata reflects the replaying, pausing, and forwarding, and
wherein the playing the second user generated content comprises the replaying, pausing, and forwarding of the second user generated content based on the heatmap.

11. A system for identifying and processing overlapping content, the system comprising one or more processors programmed with instructions to cause the one or more processors to perform:
receiving first user usage data and second user usage data indicative of user usage during consumption of a first user generated content and of a second user generated content, respectively, wherein the first and second user generated content are separate content;
determining a first user usage pattern for the first user generated content and a second user usage pattern for the second user generated content based on the first user usage data and on the second user usage data, respectively;
comparing the first usage pattern and the second usage pattern;
based on the comparing, determining the first user generated content and the second user generated content match; and
in response to the determining that the first user generated content and the second user generated content match:
accessing a heatmap of metadata reflecting at least one of replaying, seeking, scrubbing, pausing, forwarding, or rewinding portions of the first user generated content; and
playing the second user generated content, wherein the playing of the second user generated is automatically controlled by automatic application of at least one of replaying, seeking, scrubbing, pausing, forwarding, or rewinding portions of the second user generated content based on the heatmap.

12. The system of claim 11, wherein the usage data comprises user navigation data of the first and second user generated content, and wherein the user navigation data reflects at least one of the playing, replaying, seeking, scrubbing, pausing, forwarding, or rewinding of the first and second user generated content.

13. The system of claim 11, wherein the optimization operation comprises consolidating the storage of matching content in a shared location of computer memory, and wherein the optimization comprises replay of the first user generated-content and second user generated content using stored content from the shared location of computer memory.

14. The system of claim 11, wherein determining a usage pattern comprises identifying common usage activity across a plurality of user usage data around particular time segments of respective content.

15. The system of claim 11, wherein at least one of the first and second usage patterns are stored in a data file with the respective first and second user generated content.

16. The system of claim 11, wherein at least one of the first and second usage patterns are stored in a database record associated with the respective first and second user generated content.

17. The system of claim 11, wherein the first user generated content and the second user generated content are optimized for use across a plurality of user generated content platforms.

18. The system of claim 11, wherein the first user usage pattern and the second user usage pattern includes the heatmap of metadata, and wherein the heatmap of metadata reflects the at least one of replaying, seeking, scrubbing, pausing, forwarding, rewinding of particular portions of the first user generated content and the second user generated content, respectively, and wherein the heatmap of the first user generated content and the heatmap of the second user generated content are asynchronous.

19. The system of claim 11,
wherein the heatmap of metadata reflects the replaying, pausing, and forwarding, and
wherein the playing the second user generated content comprises the replaying, pausing, and forwarding of the second user generated content based on the heatmap.

* * * * *